US010169757B1

(12) United States Patent
Vippagunta et al.

(10) Patent No.: US 10,169,757 B1
(45) Date of Patent: Jan. 1, 2019

(54) SCALABLE DATA STORAGE AND RETRIEVAL

(71) Applicant: Amazon Technologies, Inc., Reno, NV (US)

(72) Inventors: Rajendra Kumar Vippagunta, Renton, WA (US); Sumesh Santha Kumar, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 866 days.

(21) Appl. No.: 13/754,495

(22) Filed: Jan. 30, 2013

(51) Int. Cl.
 *G06Q 20/00* (2012.01)
 *G06Q 20/38* (2012.01)

(52) U.S. Cl.
 CPC .............................. *G06Q 20/3829* (2013.01)

(58) Field of Classification Search
 None
 See application file for complete search history.

(56) References Cited

U.S. PATENT DOCUMENTS

| 6,496,830 | B1* | 12/2002 | Jenkins, Jr. | G06F 17/30595 |
| 6,957,196 | B1* | 10/2005 | Cordery | G06F 21/552 |
| | | | | 705/401 |
| 8,880,464 | B1* | 11/2014 | Haeske | G06F 17/30575 |
| | | | | 707/615 |
| 9,619,800 | B1* | 4/2017 | Valdyanathan | G06Q 20/40 |
| 2011/0178996 | A1* | 7/2011 | Pendlebury | G06F 11/1453 |
| | | | | 707/692 |
| 2012/0221577 | A1* | 8/2012 | Fuh | G06F 17/30312 |
| | | | | 707/741 |

* cited by examiner

*Primary Examiner* — John W Hayes
(74) *Attorney, Agent, or Firm* — Lindauer Law, PLLC

(57) ABSTRACT

Transaction data is written to one or more records in a datastore using key-value pairs. The record key for a record comprises a hash key and a range key, where the hash key corresponds to a particular transaction and the range key corresponds to a transaction type. The record key also comprises a counter to distinguish between different records storing data for the same transaction. A serialized data stream of transaction data may be apportioned into multiple data records and stored in a non-relational datastore. Each record for a transaction is individually readable, independently of the other records for the transaction. Accordingly, data records storing a large amount of transaction data for a transaction may be individual retrieved and presented at an access device, enabling a paginated view of the large amount of data with low latency in its retrieval.

20 Claims, 8 Drawing Sheets

SCALABLE DATA STORAGE AND RETRIEVAL

BACKGROUND

Data storage techniques have been an aspect of computer hardware and software systems since the earliest days of computer technology. Traditional data storage techniques have been developed to accommodate systems in which storage is scarce or otherwise at a premium. For example, systems with limited memory may employ a relational database. Such a database may enable a system to efficiently use its limited memory space through data orthogonalization, but may lead to slower read and write operations from accessing multiple tables, resolving foreign keys, and so forth. Advances in storage technology have provided computer memory with larger storage capacity at a lower cost. However, the continued use of traditional data storage techniques may lead to delays in data access operations, particularly in large data storage environments.

Figure 1:
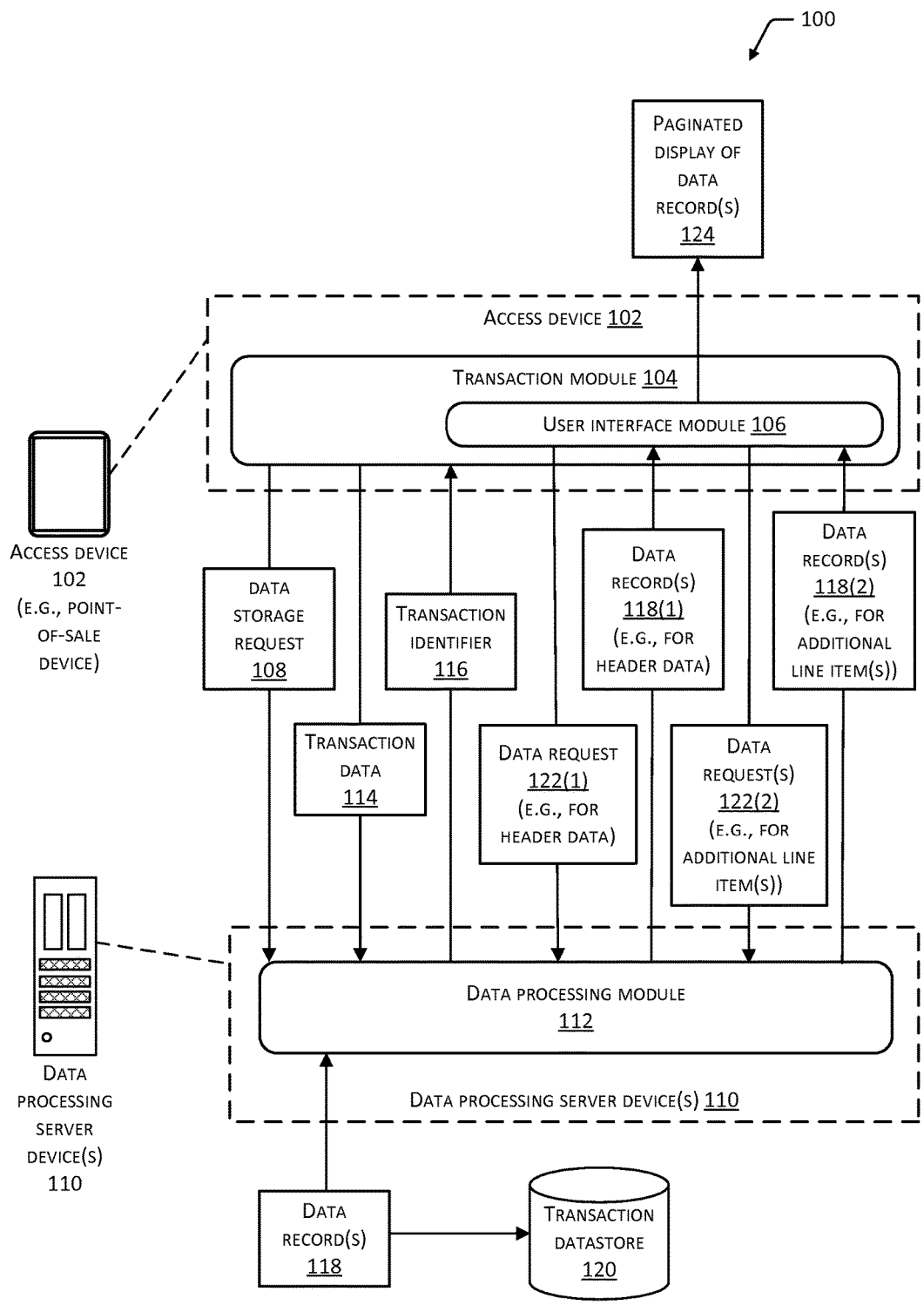
FIG. 1 depicts an environment for data storage and retrieval, including a data processing server, and an access device to send data for storage and to request stored data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for scalable data storage and retrieval. The implementations described provide for the storage and retrieval of scalable amounts of data, from small amounts up to very large amounts (e.g., on the order of petabytes, exabytes, or larger). Implementations also provide for fast access (e.g., read or write operations) to the stored data. Some implementations employ a datastore that is not a relational database, such as a "not only SQL" (NoSQL) database that does not adhere to the relational database model and does not employ a relational database management system (RDBMS). Some implementations employ a key-value datastore, in which a key is employed to access data values, documents, or portions of data stored in the datastore.

In the implementations described herein, an amount of data to be stored is received and apportioned into one or more records, each with a record size no greater than a maximum record size for the datastore (e.g., 64 kilobytes). Each of the records is stored with a record key that may be used to access the record. In some implementations, the record key includes multiple sections. The first section of the record key may uniquely identify, or may otherwise correspond to, the particular portion of data to be stored. For example, where the data to be stored includes transaction data generated through a sale, refund, or other transaction between a consumer and a merchant, the first section of the record key may uniquely identify a particular transaction. In such cases, the first section of the record key may be generated based at least in part on one or more of a date/time stamp of the transaction, a merchant identifier, a consumer identifier, an identifier for a device of the merchant, or other information. Thus, some implementations provide a record key that is unique to a particular transaction. The first section of the record key may be a hash key that is employed to perform hash-based search and retrieval operations in the datastore.

In some implementations, the record key also includes a counter that is appended to, prepended to, or otherwise included in the record key. The received data for a transaction may be divided into one or more records, each having the same hash key. In cases where multiple records are used to store the received data, each record may have a record key with a different counter. In some implementations the counters are ordinal numbers. For example, an amount of data may be stored in multiple records, with the first record having a record key with counter 0, the second record having a record key with counter 1, and so forth. Although the examples herein describe implementations where the counter values are numerically ordered as ascending values that are incremented from an initial value of 0, implementations are not so limited. In some implementations, the counter values may be in a descending order, decremented from an initial value. The counter values may be incremented or decremented by any numerical amount, or may be otherwise interrelated.

In some implementations, the record key may also include a range key prefix that is associated with a type of transaction. For example, the record key may include a range key prefix of 0000 for a first type of transaction (e.g., a sale transaction), and a range key prefix of 0001, 0002, 0003 and so forth for other types of transactions (e.g., refund transactions). In some cases, a sale transaction in which a consumer buys goods may be followed by one or more subsequent refund transactions in which the consumer returns at least some of the purchased goods in exchange for a refund of the purchase price. In some implementations, the records storing data for a sale transaction may have the same hash key as records storing data for a refund transaction, allowing for an association of the sale and refund records. The records for the sale transaction may have a different range key prefix from that of the records for the associated refund transactions, enabling sale transaction records to be distinguished from associated refund transaction records. Example record formats are described further with reference to FIG. 4.

Because the multiple records holding the stored amount of data have the same hash key and different counters, the stored data may be accessed through a hash-based search on the hash key to identify all the records that have a record key including the hash key. In some implementations, the data stored in each record may be presented independently of the data in other, related records for a transaction. When a user of an access device requests to view data for a transaction, the access device may be sent one or more records that store a first portion of the data, and that first portion may be presented to the user. The user may then request additional portions of the data, and each additional portion may be retrieved and presented as requested through pagination on the access device. Because each record is retrieved and presented independently of the other records that are related through the same hash key, data from each record may be presented on the access device even if other, related records have not been sent to the access device. Thus, implementations provide for faster loading and presentation of the requested data.

Implementations support the storage and retrieval of any type of data in any format, including but not limited to textual data, numerical data, binary data in any format, image data, audio data, or video data. The data may be unencrypted or encrypted. In some implementations, the stored data is related to transactions between a first party and a second party. In some cases, the parties may be related as merchant and consumer, buyer and seller, employer and employee, or in some other relationship. The transactions may include commercial transactions such as a sale transaction, a refund transaction, a rental transaction, a licensing transaction, and so forth.

Implementations also provide for the storage and retrieval of other types of data. For example, implementations described herein may be employed to store and retrieve data for items in a consumer shopping cart associated with an e-commerce web site. Implementations may also be employed to store and retrieve data for points of interest or saved locations entered through mapping or location software, such as coffee shops, theaters, restaurants, and so forth. Accordingly, the implementations described herein have applications beyond the storage and retrieval of commercial transaction data.

FIG. 1 depicts an example environment 100 for data storage and retrieval, according to implementations. The environment 100 includes an access device 102. In some implementations, the access device 102 may be a mobile device such as a smartphone, a personal data assistant (PDA), a tablet computer, a wearable computer, a mobile gaming device, an electronic book reader, and so forth. The access device 102 may also be a less mobile computing device such as a desktop computer, a personal computer, a laptop computer, a thin client, a terminal, a game console, a smart appliance, a home entertainment device, a mainframe computer, a server computer, a network computer, and so forth.

In some cases, the access device 102 may be a point-of-sale device that is employed by a merchant or another person in the course of business. The access device 102 may be a dedicated point-of-sale device, such as a cash register or a terminal in a store, or the access device 102 may be any type of device that includes software or hardware modules for use in sales transactions. For example, the access device 102 may be a smartphone that is used by a merchant to record sales or refunds, accept payment, view previously stored transaction data, and so forth. The access device 102 may also include any computing device used to access previously stored transaction data.

In some implementations, the access device 102 may include a transaction module 104 that performs operations for recording transactions (e.g., sales, refunds, and so forth), accepting and verifying payments from a consumer, and other operations. The transaction module 104 may generate transaction data from such operations. In some implementations, access device 102 includes a user interface module 106 that provides a graphical user interface (GUI) or other interface to allow a user to send transaction data for storage, request previously stored transaction data for presentation, or to otherwise control the operations of the transaction module 104. In some implementations, the user interface module 106 is incorporated into the transaction module 104. Alternatively, the user interface module 106 may be a separate module from the transaction module 104. An example user interface is described further with reference to FIG. 5. The access device 102 may also include other modules, and is described further below with reference to FIG. 2.

In the course of a transaction, or following a transaction, the transaction module 104 may generate transaction data. To request storage of the transaction data, the access device 102 may send a data storage request 108 to one or more data processing server device(s) 110. The data processing server device(s) 110 are described further with reference to FIG. 3. The data processing server(s) 110 include a data processing module 112, the operations of which are described further with reference to FIGS. 6-8.

After receiving the data storage request 108, or concurrently with receiving the data storage request 108, the data processing module 112 may receive transaction data 114 from the access device 102, and store the transaction data 114 according to implementations described herein. The data processing module 112 may also generate a transaction identifier 116 based on one or more of the following: information regarding the data storage request 108, an identifier of the access device 102, information identifying a user of the access device 102 (e.g., a merchant), or information regarding the transaction module 104 executing on the access device 102, such as an application namespace for the transaction module 104. In cases where a timestamp or other time and date information is employed to generate the transaction identifier, the time and data information may be hashed to ensure a more uniform distribution of identifiers with regard to time of day or date. The data processing module 112 may send the transaction identifier 116 to the transaction module 104 of the access device 102.

In some implementations, the data storage request 108 may be sent concurrently with the transaction data 114. Alternatively, the data storage request 108 may be sent prior to the transaction data 114. In some cases, the transaction identifier 116 may be generated and sent to the access device 102 following receipt of the data storage request 108 at the data processing server device(s) 110 and prior to receipt of the transaction data 114 at the data processing server device(s) 110. In such cases, the transaction data 114 sent from the access device 102 may include the transaction identifier 116.

In some implementations, the transaction data 114 may be sent as a file to the data processing server device(s) 110. The transaction data 114 may also be sent in a format that substantially complies with a protocol for exchanging structured information, such as the Simple Object Access Protocol (SOAP). In some implementations, the transaction data 114 is sent to the data processing module 112 in a data stream that is serialized according to a serialization format. As used herein, serialized data includes any type of data that is ordered in some way, and that is sent in a manner that substantially preserves the order. Any serialization scheme may be used to send the transaction data 114 to the data processing module 112. Some implementations may employ any version of the JavaScript Object Notation (JSON) standard, originally specified by Douglas Crockford and described in Request for Comments (RFC) 4627 of the Network Working Group of the Internet Engineering Task Force (IETF). Implementations may also employ a serialization standard that is based on JSON and includes one or more modifications of the JSON standard.

In some implementations, the transaction data 114 includes header data in a first portion, and data for one or more line items in a second portion. In cases where the transaction data 114 includes data for a commercial transaction such as a sale or refund, the header data may include data that is common to the transaction as a whole. For example, such header data may include, but is not limited to, one or more of the following: a date and time of the transaction, a name or identifier of the parties involved (e.g., the consumer and the merchant), an identifier of the access device 102 that generated the transaction data 114, an identifier (e.g., a version number) of the transaction module 104 or other modules executing on the access device 102, a physical location of the transaction, or a total amount of payment or refund transferred during the transaction.

Each of the line items may comprise information for a particular item purchased in a sale transaction or returned in a refund transaction. Information in the line items may include, but is not limited to, the following: a product or service name, product or service description, product or service identification number, such as a stock-keeping unit (SKU) identifier, a quantity of the item, a sale price of the item, a refund amount for the item, or one or more characteristics of the purchased item such as color, material, model, specifications, and so forth. Implementations support transaction data 114 of any size, including any amount of header data, and including any amount of line item data in any number of line items.

On receiving the transaction data 114, the data processing module 112 may apportion the transaction data 114 into one or more data records 118. In some implementations, the first record of the data record(s) 118 contains header data and as many whole line items as may fit in the first record, given its record size. In some cases, one or more initial records of the data record(s) 118 may include header data, without any line item data. In cases where the transaction data 114 includes additional line items other than the line item(s) stored in the header records, subsequent records may each contain one or more of the additional line items. The data processing module 112 may also generate a record key for each of the data record(s) 118, as described further herein. The data record(s) 118 may be stored according to their respective record key(s) in a transaction datastore 120. The data record(s) 118 storing data from the transaction data 114 may be related to each other through a common hash key, with different ones of the data record(s) 118 being distinguished by different counter values as described above. In some cases, different transaction types may be distinguished through the use of a range key prefix associated with a transaction type (e.g., a sale transaction, a first refund transaction, a second refund transaction, and so forth). The record keys are described further with reference to FIG. 4.

In some implementations, the transaction datastore 120 is a non-relational database that employs a key-value or key-record paradigm for data storage and retrieval. For example, the transaction datastore 120 may be a NoSQL database. Alternatively, the transaction datastore 120 may include a relational database, such as a database that accepts queries in any version of the Structured Query Language (SQL). The transaction datastore 120 may employ any data storage technologies, including but not limited to those provided by Oracle®, Apache® Hadoop, Teradata®, ParAccel®, or MySQL®. Moreover, the transaction datastore 120 may employ any type of data storage paradigm, including but not limited to key-value datastores, hash tables, relational databases, hierarchical databases, networked databases, flat files, or unstructured data storage. In some implementations, the transaction datastore 120 comprises at least one of a plurality of data storages nodes in a data warehouse.

After the transaction data 114 has been stored in the transaction datastore 120 in the data record(s) 118, the data processing server device(s) 110 may receive one or more data request(s) 122 for retrieval or presentation of the stored data. In some cases, the data request(s) 122 may be received from the access device 102. Alternatively, the data request(s) 122 may be received from other devices, individuals, or processes, including processes executing locally on the data processing server device(s) 110 or users of the data processing server device(s) 110.

In some implementations, the access device 102 may send an initial data request 122(1) that is a request for a first portion of the stored data from the transaction data 114. In response to the data request 122(1), the data processing module 112 may send one or more first data records 118(1), e.g., the data record(s) 118(1) that include the header data and zero or more line items for the transaction. The data record(s) 118(1) may be received by the transaction module 104, or the user interface module 106, of the access device 102. The user interface module 106 may present the data from the data record(s) 118(1) to user of the access device 102. Each portion of data stored in each of the data record(s) 118 is viewable independently of the other data record(s) 118. Accordingly, data from the data record(s) 118(1) may be presented by the user interface module 106 even in cases where other data record(s) 118 have not been retrieved from the transaction datastore 120 and sent to the access device 102.

If the user desires to view additional data from the transaction, e.g., additional line items, the transaction module 104 may send one or more subsequent data request(s) 122(2) to the data processing module 112. In response to the subsequent data request(s) 122(2), the data processing module 112 may send one or more additional data record(s) 118(2) to the access device 102, and the additional data record(s) 118(2) may be presented through the user interface module 106.

Because data of each of the data record(s) 118 is viewable independently of the other data record(s) 118 for a transaction, the user may progressively request more data for viewing through the user interface module 106. The user interface module 106 may present as much data as requested by the user of the access device 102. This capability for progressively viewing data record(s) 118 as requested enables a paginated display 124 of the data record(s) 118 through the user interface module 106. The paginated display 124 enables a user to view a first record of transaction data without a need to retrieve all the data record(s) 118. Accordingly, the paginated display 124 provides for a lower latency of data retrieval and presentation, and for a more positive user experience for a user viewing the transaction data on the access device 102.

In some implementations, the access device 102, the data processing server device(s) 110, the transaction datastore 120, or other devices may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

The data storage request 108, the data request(s) 122, and other communications between the various devices shown in FIG. 1, including the communications of the transaction identifier 116, the transaction data 114, and the data record(s) 118, may be sent using any communications protocol supported by the networks, including but not limited to packet-based or datagram-based protocols such as the internet protocol (IP), the transmission control protocol (TCP), the user datagram protocol (UDP), or the hypertext transfer protocol (HTTP).

In some implementations, at least some of the communications between the various devices of FIG. 1 may employ encryption or a secure communications session. For example, in some cases, the communications between the access device 102 and the data processing server device(s) 110 may employ any version of the Secure Sockets Layer (SSL) protocol, or any version of the Transport Layer Security (TLS) protocol, employing public or private cryptographic keys, client-side or server-side certificates, or any other security measures.

Implementations are not limited to the particular example environment 100 depicted in FIG. 1. In some implementations, one or more additional intermediate devices may mediate interactions between the access device 102 and the data processing server device(s) 110. In some cases, such intermediate device(s) may receive the transaction data 114 from the access device 102 in a first data format (e.g., JSON or a derivative of JSON), and the intermediate device(s) may reformat or otherwise process the transaction data 114 to a second data format (e.g., SOAP) prior to sending the transaction data 114 on to the data processing module 112. In some cases, this intermediate layer may be a web application layer of hardware and software components. Alternatively, the intermediate layer may execute as a software layer on the data processing server device(s) 110. In some cases, the intermediate layer of hardware or software components may include components that have high throughput or low latency in communications, to provide for faster communications with the access device 102 or the data processing server device(s) 110.

Figure 2:
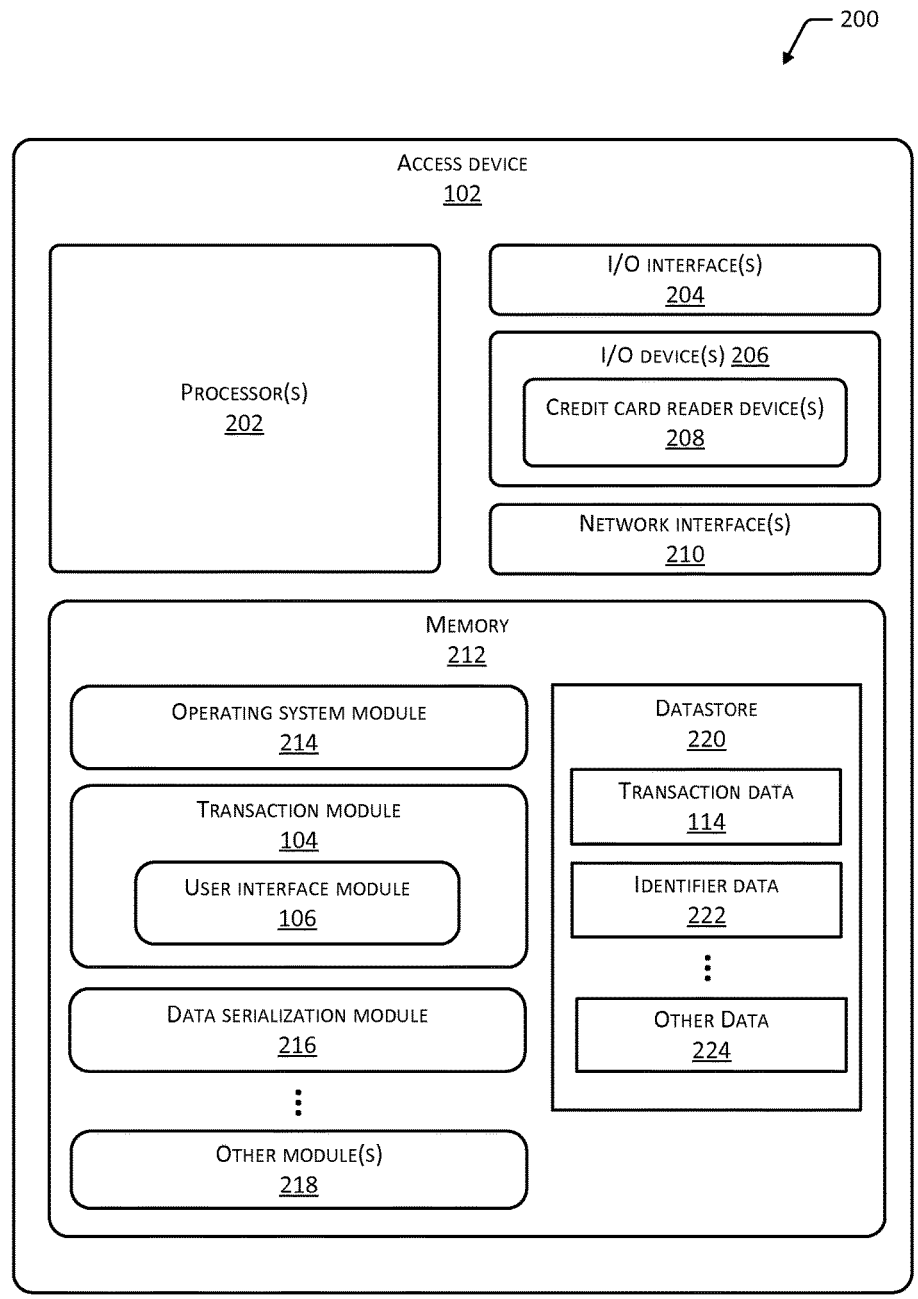
FIG. 2 depicts a block diagram of an access device configured to perform operations for receiving data, sending data for storage, and viewing previously stored data.

FIG. 2 depicts a block diagram 200 of the access device 102 configured to perform operations for receiving data, sending data for storage, and viewing previously stored data. In some implementations, multiple components of the access device 102 may be on a same die, as in a system-on-a-chip (SoC) or a field-programmable gate array (FPGA). The access device 102 may include one or more processors 202 configured to execute one or more stored instructions. The processor(s) 202 may comprise one or more cores.

The access device 102 may include one or more input/output (I/O) interfaces 204 to allow the device to communicate with other devices. The I/O interface(s) 204 may enable information to be transferred in or out of the access device 102 through serial communication, parallel communication, or both serial and parallel. For example, the I/O interface(s) 204 may comply with the RS-232 standard for serial ports, or with the Institute of Electrical and Electronics Engineers (IEEE) 1284 standard for parallel ports. As another example, the I/O interface(s) 204 may be configured to provide a USB connection.

The I/O interface(s) 204 may couple to one or more I/O devices 206. The I/O device(s) 206 may include user input devices such as one or more of a keyboard, a mouse, a pen, a game controller, a voice input device, a touch input device, a gestural input device, a haptic input device, or other devices. The I/O device(s) 206 may also include output devices such as one or more of a display, a printer, audio speakers, haptic output devices, and so forth. In some implementations, the I/O device(s) 206 may include one or more credit card reader device(s) 208 to enable a user of the access device 102 to read information from a credit card or other payment instrument. In some implementations, the I/O device(s) 206 may be physically incorporated with or in physical contact with the access device 102. Alternatively, the I/O device(s) 206 may be externally placed.

The access device 102 may also include one or more network interfaces 210 to enable communications between the access device 102 and other network-accessible devices such as those shown in FIG. 1. Such network interface(s) 210 may include one or more network interface controllers (NICs) or other types of transceiver devices configured to send and receive communications over a network. The access device 102 may also include one or more busses or other internal communications hardware or software that allow for the transfer of data between the various modules and components of the access device 102.

As shown in FIG. 2, the access device 102 includes one or more memories, described herein as memory 212. The memory 212 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 212 provides storage of computer-readable instructions, data structures, program modules, and other data for the operation of the access device 102.

The memory 212 may include at least one operating system (OS) module 214. The OS module 214 is configured to manage hardware resources such as the I/O interface(s) 204, the I/O device(s) 206, and the network interface(s) 210, and to provide various services to applications or modules executing on the processor(s) 202. The OS module 214 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; any version of VxWorks from Wind River Systems of Alameda, Calif.; or other operating systems.

The memory 212 includes the transaction module 104 and the user interface module 106. In the example shown in FIG. 2, the user interface module 106 is included with the transaction module 104 (e.g., executing as a sub-process or child process spawned from the transaction module 104).

Alternatively, the user interface module 106 may be a separate module from the transaction module 104. The operations of the transaction module 104 are described below with reference to FIGS. 6-8. The user interface module 106 may provide a user interface for presenting transaction data, as described further with reference to FIG. 5. In some implementations, the user interface module 106 may include a web browser application such as Mozilla® Firefox®, Microsoft® Internet Explorer®, Google® Chrome®, Apple® Safari®, Rockmelt®, or other web browsers, to access a web site hosted by the data processing module 112 or another component of the data processing server device(s) 110.

In some implementations, the memory 212 includes a data serialization module 216 to send the transaction data 114. In some cases, the data serialization module 216 includes software to send the transaction data 114 in a data stream that is compliant with the JSON standard or other standards. The memory 212 may also include one or more other modules 218, such as a user authentication module, an access control module, and so forth.

In some implementations, the memory 212 includes a datastore 220 to store information for operations of the access device 102. The datastore 220 may comprise a database, array, structured list, tree, or other data structure. In some implementations, the datastore 220 may store the transaction data 114 for one or more transactions conducted between a user of the access device 102 and one or more other individuals (e.g., consumers). The transaction data 114 for a transaction may include header data and line item data for a sale, a refund, or other type of transaction, as described further herein.

The datastore 220 may also store identifier data 222, including one or more transaction identifier(s) 116, or abbreviated transaction identifiers such as those described below with reference to FIG. 3. In some implementations, the datastore 220 may store other data 224, such as user account information, user authentication information, and so forth.

Figure 3:
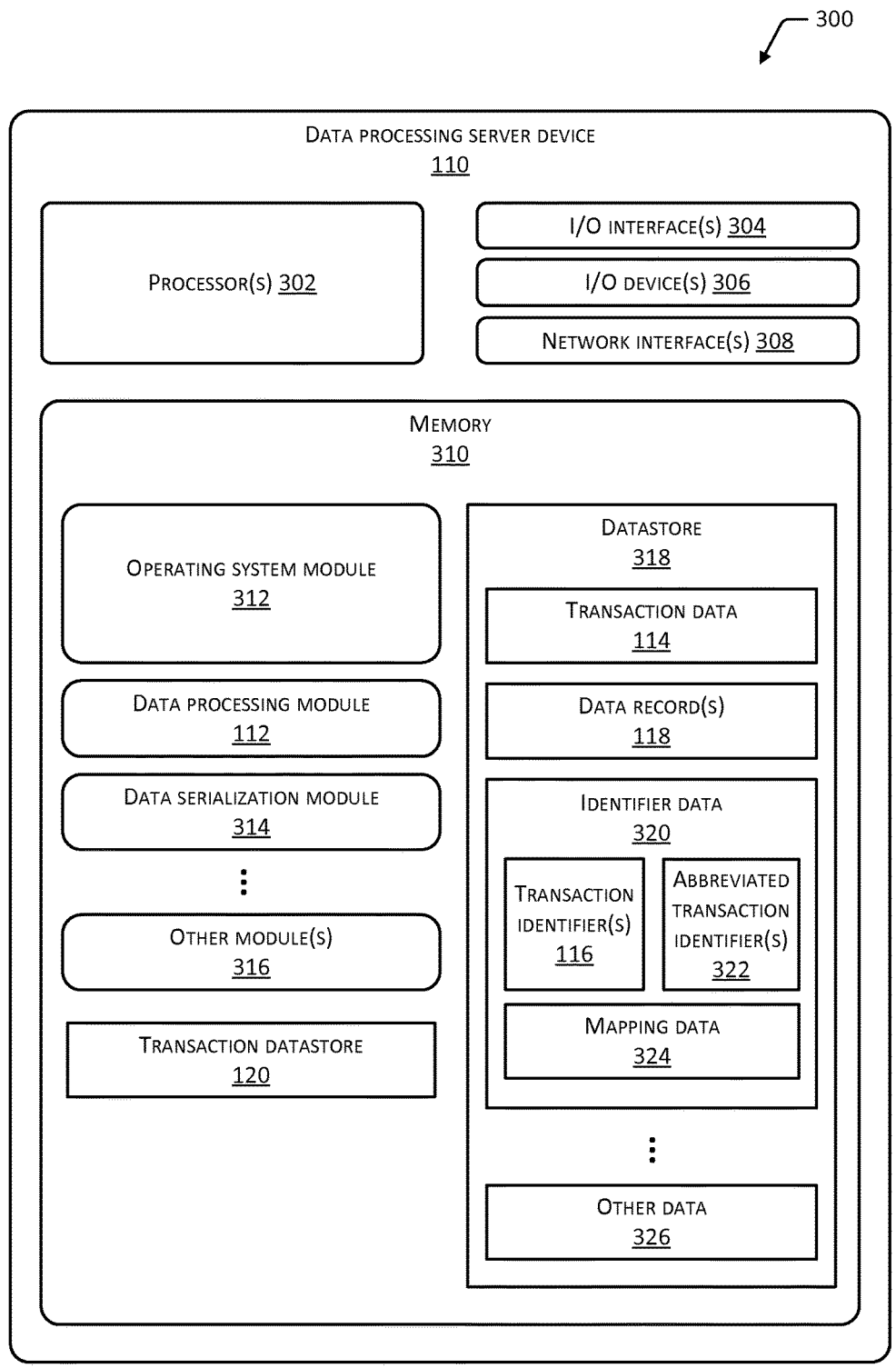
FIG. 3 depicts a block diagram of a data processing server device, configured to perform operations for receiving, processing, storing, and retrieving data.

FIG. 3 depicts a block diagram 300 of the data processing server device 110, configured to perform operations for receiving, processing, storing, and retrieving data. The data processing server device 110 may include one or more processors 302 configured to execute one or more stored instructions. The processor(s) 302 may comprise one or more cores.

The data processing server device 110 may include one or more I/O interfaces 304 to allow the data processing server device 110 to communicate with other devices, such as the access device 102. The I/O interface(s) 304 may enable information to be transferred in or out of the data processing server device 110 through serial communication, parallel communication, or both serial and parallel. For example, the I/O interface(s) 304 may comply with the RS-232 standard for serial ports, or with the IEEE 1284 standard for parallel ports. As another example, the I/O interface(s) 304 may be configured to provide a USB connection.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, a haptic input device, or other devices. The I/O device(s) 306 may also include output devices such as one or more of a display, a printer, audio speakers, haptic output devices, and so forth. In implementations, the I/O device(s) 306 may be physically incorporated with the data processing server device 110, or may be externally placed.

The data processing server device 110 may also include one or more network interfaces 308 to enable communications between the device and other networked devices. Such network interface(s) 308 may include one or more NICs or other types of transceiver devices configured to send and receive communications over a network. The data processing server device 110 may also include one or more busses or other internal communications hardware or software that allow for the transfer of data between the various modules and components of the data processing server device 110.

The data processing server device 110 includes one or more memories, described herein as memory 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the data processing server device 110.

The memory 310 may include at least one OS module 312. The OS module 312 is configured to manage hardware resources such as the I/O interface(s) 304, the I/O device(s) 306, and the network interface(s) 308, and to provide various services to applications or modules executing on the processor(s) 302. The OS module 312 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; any version of VxWorks from Wind River Systems of Alameda, Calif.; or other operating systems.

Figure 6:
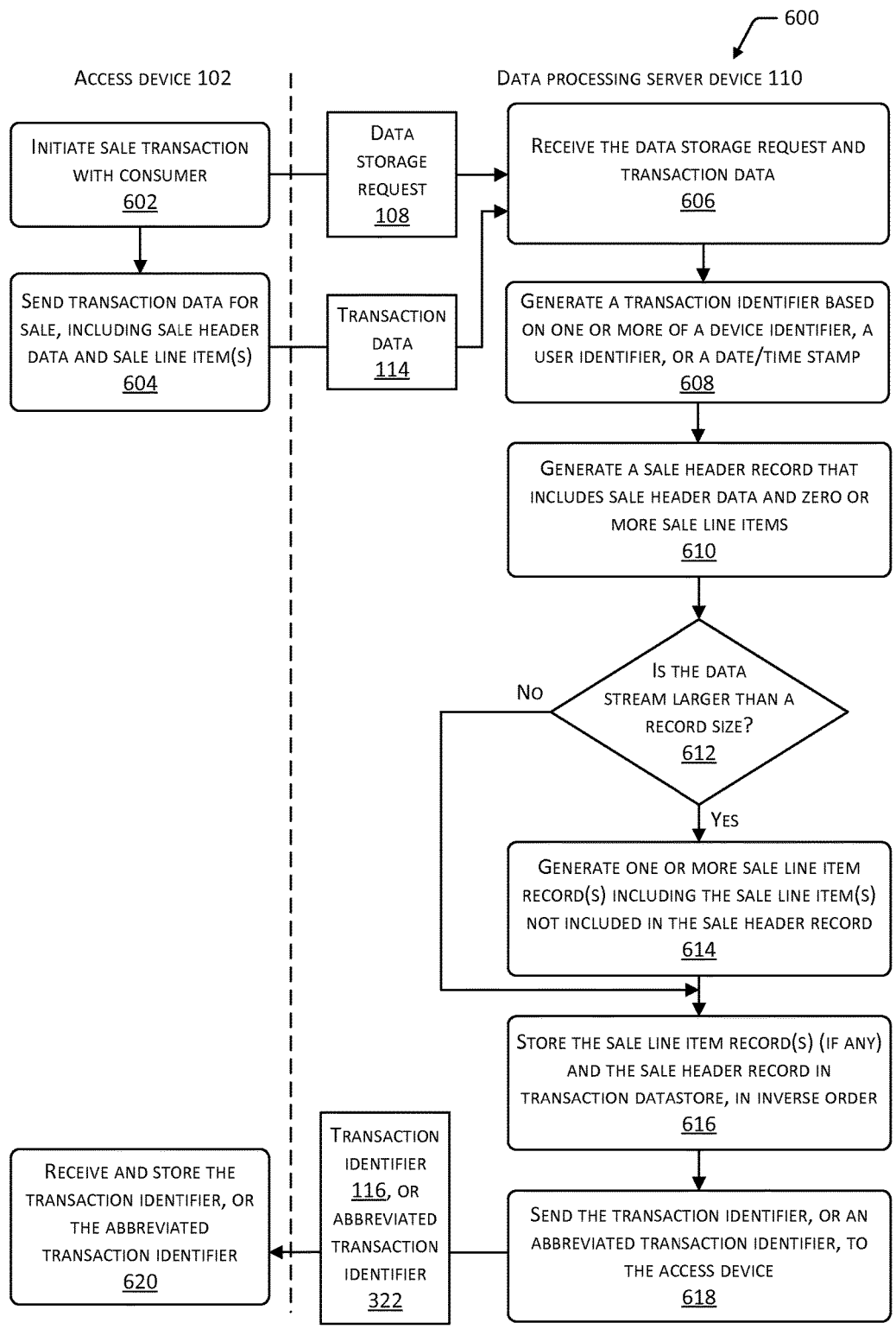
FIG. 6 depicts a flow diagram of a process for storing data associated with a first type of transaction, e.g., sale transaction data, in a transaction datastore.
Figure 7:
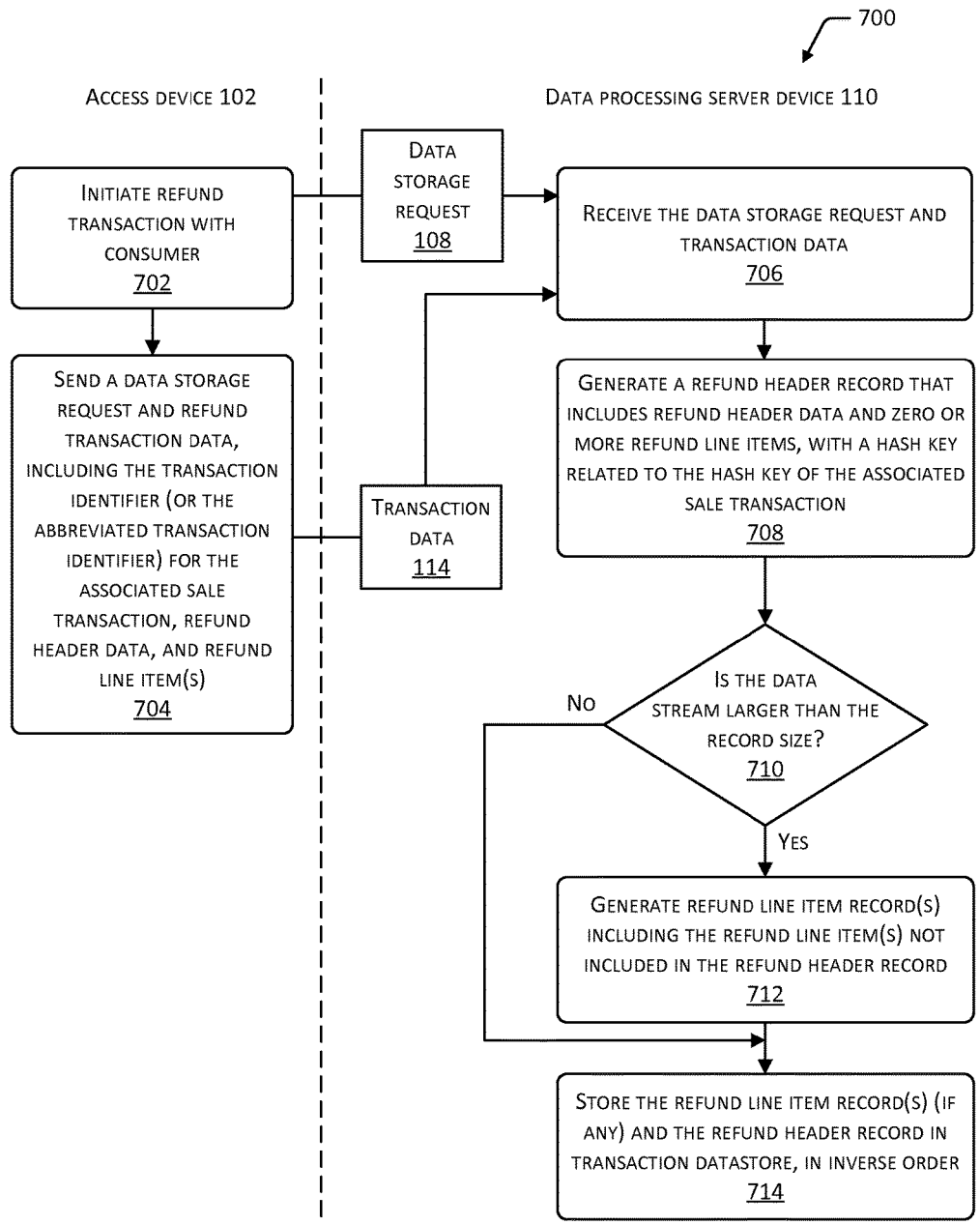
FIG. 7 depicts a flow diagram of a process for storing data associated with a second type of transaction, e.g., refund transaction data, in the transaction datastore.
Figure 8:
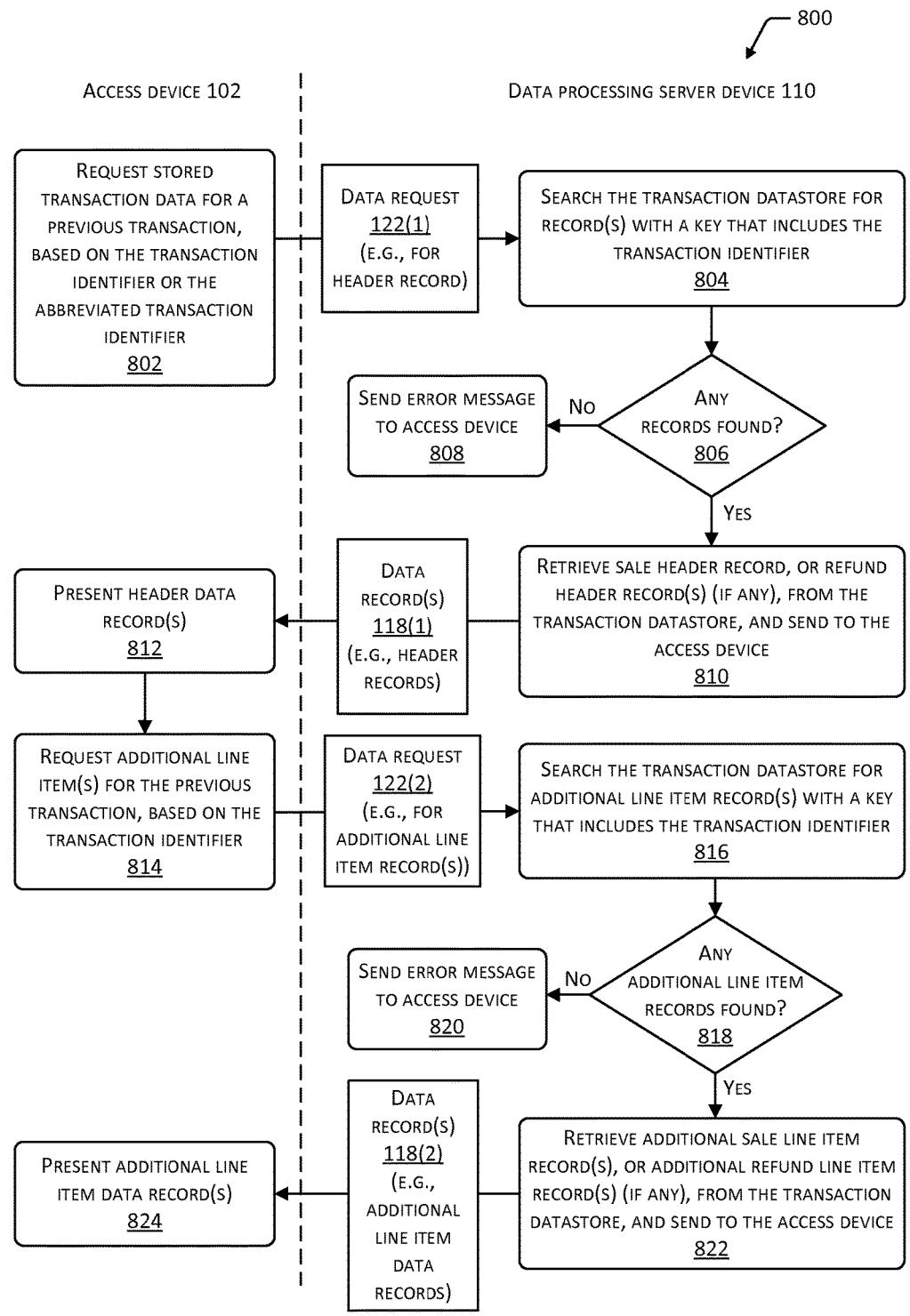
FIG. 8 depicts a flow diagram of a process for retrieving a first portion of stored data for presentation on the access device, and subsequently retrieving one or more additional portions of the stored data for paginated presentation on the access device.

In some implementations, the memory 310 includes the data processing module 112, the operations of which are described further with reference to FIGS. 6-8. The memory 310 may also include a data serialization module 314 to receive and parse serialized data such as the transaction data 114. The memory 310 may also include other modules 316, such as a user authentication module, an access control module, a payment processing module, and so forth.

The memory 310 may also include a datastore 318 to store information for operations of the data processing server device 110. The datastore 318 may comprise a database, array, structured list, tree, or other data structure. The datastore 318 may include at least a portion of the transaction data 114 received from the access device 102, such as in implementations where at least a portion of the transaction data 114 is cached prior to or during further processing. The datastore 318 may also include one or more of the data record(s) 118 generated based on an analysis of the transaction data 114.

The datastore 318 may also include identifier data 320. The identifier data 320 may include one or more transaction identifiers 116. In some implementations, the transaction identifier(s) 116 may be generated to identify the transaction described in the transaction data 114. The transaction identifier(s) 116 may be generated based on information regarding the transaction, such as a date/time stamp, identifiers of one or more of the parties involved in the transaction, an identifier of the access device 102, and so forth. The transaction identifier(s) 116 may also be generated based on other information, or through a random or pseudo-random process.

Because the transaction identifier(s) 116 may be long, difficult for a user to read, or difficult for a user to enter into a device interface, some implementations may generate a more user friendly identifier in the form of an abbreviated transaction identifier 322 corresponding to each transaction identifier 116. In such cases, the abbreviated transaction identifier 322 may be associated with the transaction identifier 116 through mapping data 324. The mapping data 324 may include a mapping table or other data structure associating the transaction identifier 116 with the abbreviated transaction identifier 322. One or more of the transaction identifier(s) 116, the abbreviated transaction identifier(s) 322, or the mapping data 324 may be included in the identifier data 320.

The abbreviated transaction identifier 322 may be sent to the access device 102, and the abbreviated transaction identifier 322 may be stored on the access device 102 and accessed by a user of the access device 102 (e.g., a merchant). The abbreviated transaction identifier 322 may also be provided to a consumer or other end-user on a receipt, through an e-mail, through a text message, or through other means. The consumer or merchant may then use the abbreviated transaction identifier 322 to request a refund of at least a portion of the transaction, or to view data for the transaction.

The datastore 318 may also store other data 326, such as user account information, user authentication information, payment processing information, and so forth. In some implementations, the memory 310 includes the transaction datastore 120. Alternatively, the transaction datastore 120 may be included in the datastore 318, or may be external to the data processing server device 110, as shown in FIG. 1.

Figure 4:
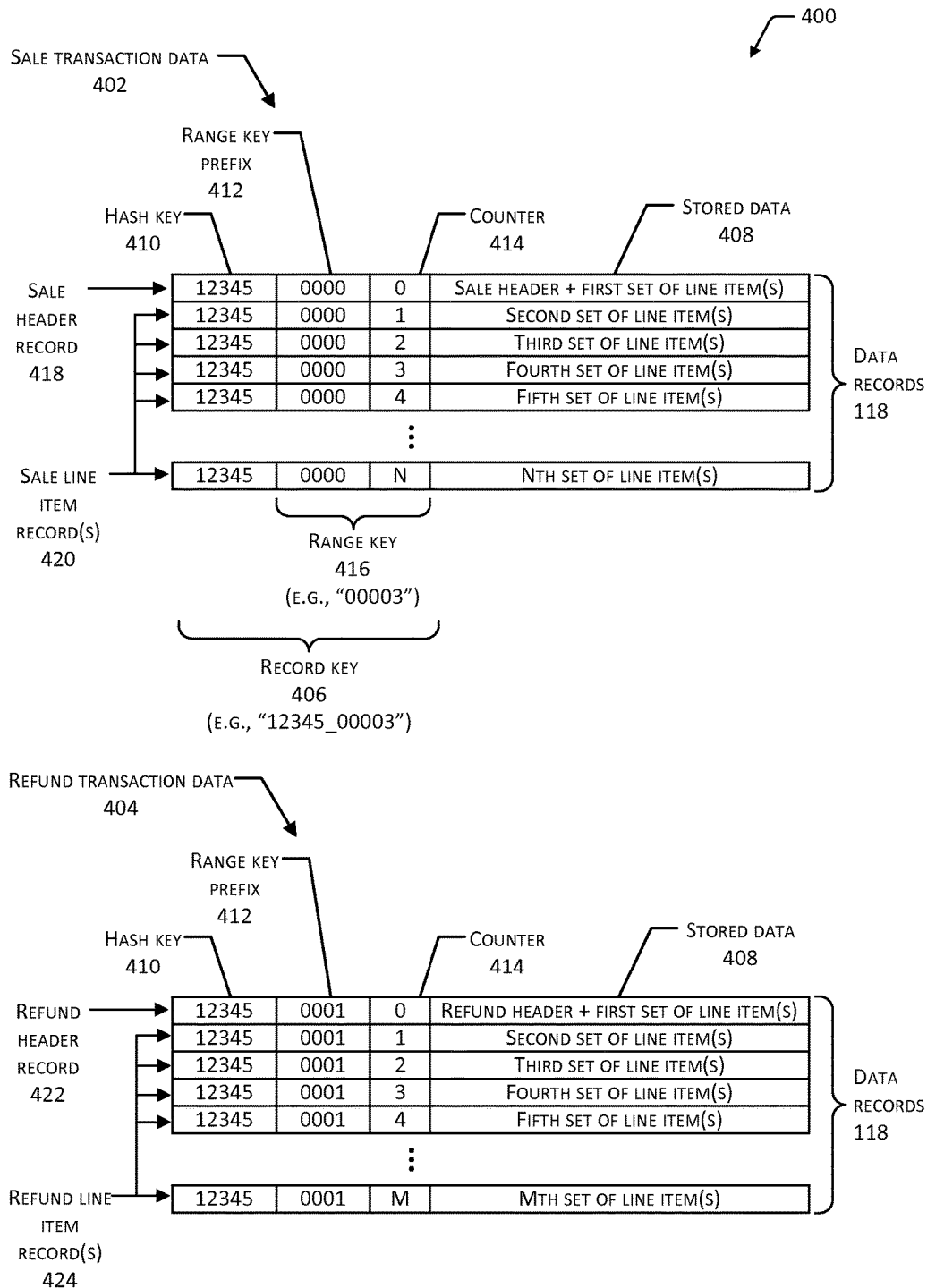
FIG. 4 depicts a schematic of an example data layout for one or more data records of sale transaction data and refund transaction data.

FIG. 4 depicts a schematic 400 of an example data layout for the data record(s) 118. The schematic 400 includes example data layouts for two types of transaction data 114: sale transaction data 402 and refund transaction data 404. Although examples herein describe these two types of transactions, implementations support any number of transaction types.

The sale transaction data 402 includes one or more data records 118 which store data associated with a sale transaction. Each of the data record(s) 118 may be arranged as a key-value pair, in which the record key 406 identifies the data stored 408. In the schematic of FIG. 4, each row corresponds to an individual data record 118. In some implementations, the record key 406 uniquely identifies a data record 118. Implementations support data records 118 of any size. In some implementations, the data record(s) 118 may have a record size of 64 kilobytes.

In some implementations, the record key 406 includes a hash key 410, which is the same for all the data records 118 that store data for a particular sale transaction, or data for refunds against that sale transaction. In some implementations, the hash key 410 may be generated based on the transaction identifier 116. In some implementations, the hash key 410 may be the same as the transaction identifier 116, or may include the transaction identifier 116.

The record key 406 may also include a range key prefix 412, which corresponds to a transaction type. For example, where the data records 118 store sale transaction data 402, the range key prefix 412 may be a first predetermined value (e.g., 0000 as in the example shown). Where the data records 118 store refund transaction data 404, the range key prefix 412 may be a second predetermined value (e.g., 0001 as in the example shown). A refund may be transacted with regard to a particular sale transaction, such that all or some of the purchased items are returned in exchange for a complete or partial refund of payment. In cases where more than one refund transaction is associated with a sale transaction, the range key prefix 412 may be incremented, decremented, or otherwise updated for each refund transaction. For example, a sale transaction may be followed by multiple refund transactions in which a consumer returns items purchased in the sale transaction. In such cases, the first refund transaction may have a range key prefix 412 of 0001, the second refund transaction may have a range key prefix 412 of 0002, and so forth.

The record key 406 may also include a counter 414, which distinguishes multiple records that store data for a particular transaction. In some cases, the counter 414 is initialized to an initial value (e.g., 0) for the first of the data records 118 that store data for a particular transaction. The counter 414 may be incremented, decremented, or otherwise updated for subsequent records. For example, as shown in FIG. 4, the first of the data records 118 storing the sale transaction data 402 has the counter 414 set to 0, the second has the counter 414 set to 1, and so forth. In some implementations, the counter 414 is reset to its initial value for each transaction. Thus, the data records 118 storing the refund transaction data 404 include a first record with the counter 414 set to 0, a second record with the counter 414 set to 1, and so forth. The range key prefix 412 and the counter 414 form the range key 416, which provides a key value for all the data records 118 associated with a particular hash key 410 (e.g., all the records related to a particular transaction).

Although the examples described herein include counter(s) 414 that are ascending or descending ordinal numbers, incremented or decremented by a particular value, implementations are not limited to these examples. In some implementations, the counter(s) 414 are time-based such that the records are ordered based on a timestamp when each record was written.

Because the sale transaction data 402 and the refund transaction data 404 are stored in records that each have the same hash key 410 (e.g., 12345 in the example shown), implementations may employ the hash key 410 to determine a relationship between the sale transaction and the refund transaction. To identify all the records for a sale transaction and any subsequent refund transactions, implementations may search the transaction datastore 120 for those records with the hash key 410 corresponding to the sale transaction. The range key prefix 412 may then be employed to determine which of the data records 118 store the sale transaction data 402 and which of the data records 118 store the refund transaction data 404. In some implementations which do not distinguish between different transaction types, the range key prefix 412 may be omitted from the record key 406. In such cases, the record key 406 may comprise the hash key 410 and the counter 414.

In some implementations, the transaction data 114 is received from the access device 102 in a serialized data stream, such that the data included in the transaction data 114 is ordered. For example, transaction data 114 that includes the sale transaction data 402 or the refund transaction data 404 may include header data at the start of the transaction data 114, followed by one or more line items. In such cases, the data records 118 may be generated such that the first record stores the header data and as many line items as can fit in the remaining space of the first record. Subsequent records may store the remaining line items for the transaction. Some implementations may employ data records 118 with a fixed record size, such as 64 kilobytes. Alternatively, implementations may employ data records 118 with a variable record size.

In the example shown in FIG. 4, the first of the data records 118 for the sale transaction data 402 stores sale header data, and is therefore designated as a sale header record 418. Subsequent records storing the sale transaction data, e.g., records that do not include sale header data, are designated as sale line item record(s) 420. Moreover, the first of the data records 118 for the refund transaction data 404 stores refund header data, and is therefore designated as a refund header record 422. Subsequent records storing the refund transaction data, e.g., records that do not include refund header data, are designated as refund line item record(s) 424.

Although the example of FIG. 4 depicts a single sale header record 418 and a single refund header record 422, implementations are not so limited. Any number of the data records 118 may be employed to store the header data, and any number of the data records 118 may be employed to store line item data. For example, where the record size is 64 kilobytes and a transaction includes 100 kilobytes of header data, two of the data record(s) 118 may be employed to store the header data. Moreover, data for zero or more line items may be stored in the first record, according to the space available. In some implementations, whole line items are stored in the data record(s) 118, such that data for each line item is stored in one of the data record(s) 118. Consequently, each of the data record(s) 118 may be retrieved and presented on the access device 102, independently of the other data records.

Moreover, although FIG. 4 depicts the various portions of the record key 406 with particular sizes and data types, implementations are not limited to these examples. Accordingly, implementations may employ any data size and any data type for the hash key 410, the range key prefix 412, and the counter 414. Moreover, the data stored 408 may have any data size and may be of any data type. In some implementations, the data stored 408 includes data that is presentable as plaintext.

Figure 5:
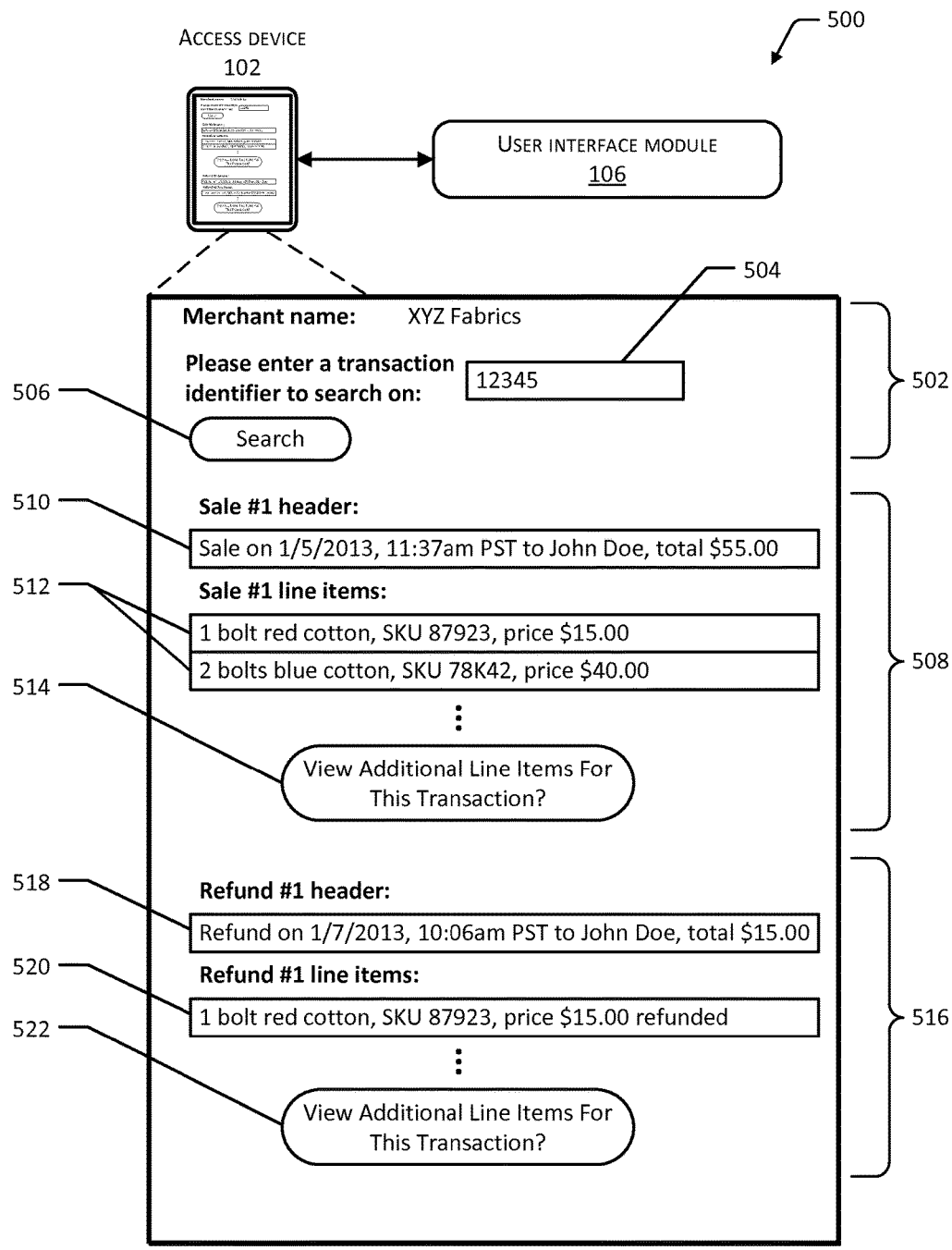
FIG. 5 depicts an example user interface to enable a user to access stored data, and request additional portions of stored data to be accessed through the pagination provided by the user interface.

FIG. 5 depicts an example user interface 500 to enable a user of the access device 102 to request transaction information from the data processing server device(s) 110, and to view the requested transaction information. In some implementations, the user interface 500 may be presented by the user interface module 106, the transaction module 104, or another module of the access device 102.

In some implementations, a merchant or other user of the access device 102 may be identified or authenticated to the user interface 500, such as through use of a login, password, identification number, and so forth. The user may then be presented with a section 502 which identifies the user or an associated business name (e.g., "XYZ Fabrics" in the example shown). The section 502 may also include a field 504 in which the user may enter a transaction identifier to search on. The field 504 may accept one or both of the transaction identifier or the abbreviated transaction identifier as described above.

After entering the data to search on, the user may employ a control 506 to request a search on the entered data. A gesture (e.g., button press) of the control 506 may generate a data request 122, requesting that the data processing module 112 search the transaction datastore 120 for records corresponding to the identifier entered in field 504. If no data records 118 are found that correspond to the entered identifier, the user may be presented with an error message, a warning, an alert, or other information indicating that no records were found.

If data records 118 corresponding to the entered identifier are found in the transaction datastore 120, then a first portion of data for each corresponding transaction may be sent to the access device 102 and displayed in the user interface 500. In the example shown, two transactions were found corresponding to the entered identifier: a sale transaction, and one associated refund transaction. Section 508 of the user interface 500 presents information describing the sale transaction. The section 508 includes a field 510 which presents header data for the sale transaction, including a consumer name, a date and time for the transaction, a total amount paid for the transaction, and so forth. The section 508 also includes one or more fields 512, each displaying a line item associated with the sale transaction.

The section 508 also includes a control 514, which enables the user to request to view additional line items for the transaction. In some implementations, the control 514 may be present or enabled for input when there is additional data (e.g., more line items) for the transaction stored in the transaction datastore 120. By performing a gesture (e.g., button press) on the control 514, the user may generate a data request 122(2) that is sent to the data processing module 112, requesting additional data record(s) 118(2) for additional data associated with the transaction. In this way, implementations may enable a paginated view of the data for a transaction. Through the paginated view, a user may request as much information as he/she desires in one or more portions. Because each portion may be retrieved and presented independently of other portions, implementations may provide for low latency in data retrieval.

In the example of FIG. 5, the user interface 500 also includes a section 516 to present information for a refund transaction associated with the sale transaction presented in section 508. The section 516 may include a field 518 to present header data for the refund transaction, and one or more field(s) 520 to present line item data for the refund. The section 516 may also include a control 522 that the user may employ to generate a data request 122(2) to request additional data associated with the refund transaction.

Although FIG. 5 shows an example user interface 500 with various user interface elements in particular positions, the particular arrangement shown is not in any way limiting of implementations. Implementations may employ a user interface that includes more or fewer user interface elements or controls or different types of user interface elements or controls, in any combination and in any arrangement to enable functionality of the implementations. Further, implementations may support multiple user interfaces (e.g., multipage web sites) with functionality spread across various pages. Implementations may also support dynamically generated interfaces, where the particular user interface elements displayed and the location or duration of their display is based on a particular state of the system, characteristics of the user, characteristics of the access device 102, or other factors. Although the example user interface 500 is presented as a visual display, the user interface 500 may employ other means for presenting data such as audio playback or haptic feedback.

FIG. 6 depicts a flow diagram 600 of a process for storing data associated with a first type of transaction, e.g., sale transaction data, in the transaction datastore 120. The flow diagram 600 depicts operations performed on the access device 102, operations performed on the data processing server device(s) 110, and communications between the access device 102 and the data processing server device(s) 110. In some implementations, the operations performed on the access device 102 are performed by the transaction module 104, and the operations performed on the data processing server device(s) 110 are performed by the data processing module 112.

At 602, a sale transaction is initiated between a consumer and a user of the access device 102 (e.g., a merchant). Implementations support any type of transactions, including the sale, lease, licensing, contracting for services, donations, and so forth. The sale transaction may be described in transaction data 114 that is generated on the access device 102 and sent to the data processing server device(s) 110. During the sale transaction, or after completion of the sale transaction, the access device 102 may send the data storage request 108 to request that at least a portion of the transaction data 114 be stored in the transaction datastore 120.

In some implementations, the data storage request 108 may include authentication information, by which the access device 102 is authenticated to the data processing server device 110. Such authentication may be through a login and password, through a certificate-based validation, through a validation of the IP or MAC address of the access device 102 (e.g., checking addresses against a white list of allowed devices), using public or private keys (e.g., through an SSL handshake), or using other authentication methods.

At 604, the access device 102 may send the transaction data 114 for the sale transaction to the data processing server device 110. In some implementations, the transaction data 114 includes sale header data and data for one or more sale line items. In some implementations, the transaction data 114 is serialized. Serialization of the data may include the processing of one or more runtime objects or classes of a program executing on the access device 102, to generate a data stream that includes data for a particular state of the runtime objects or classes. Serialization of the data may include inserting one or more metadata elements into the transaction data 114, to describe one or more data elements of the transaction data 114. Serialization may also include altering a format of the transaction data 114. Serialization of the data may enable a receiving process (e.g., executing on the data processing server device(s) 110) to reconstruct the runtime objects or classes in the state that they were in when they were serialized on the access device 102. The transaction data 114 may be serialized according to a serialization standard such as the JSON standard.

In some implementations, the sending of the data storage request 108 and the transaction data 114 may be performed concurrently in separate communications, or in a same communication between the access device 102 and the data processing server device 110. In some cases, the data storage request 108 may be sent prior to the sending of the transaction data 114, in a separate communication. In such cases, the sending of the data storage request 108 may be sent in a synchronous communication, such that the access device 102 may not proceed with sending the transaction data 114 until it receives an acknowledgement or other response message from the data processing server device 110. In some cases, the acknowledgement of the data storage request 108 by the data processing server device 110 may include a transaction identifier 116 or an abbreviated transaction identifier 322 corresponding to the sale transaction, and the transaction data 114 may then be sent in an asynchronous communication that includes the transaction identifier 116 or the abbreviated transaction identifier 322.

At 606, the data processing server device 110 receives the data storage request 108 and the transaction data 114. At 608, the transaction identifier 116 is generated. The transaction identifier 116 may be generated based on information regarding the transaction, such as a date/time stamp, identifiers of one or more of the parties involved in the transaction, an identifier, an IP address, or a Media Access Control (MAC) address of the access device 102, and so forth. Alternatively, the transaction identifier 116 may be generated based at least partly on other information, or based at least partly on a random or pseudo-random process.

At 610, a sale header record is generated to store a first portion of the transaction data 114. The sale header record may be generated with a format as described with reference to FIG. 4, and may include header data for the transaction. The sale header record may also include data for zero or more line items. In some implementations, the sale header record may include data for as many whole line items as may be included without exceeding a record size (e.g., 64 kilobytes). In some implementations, the sale header record, and subsequent line item records, may be generated with a hash key 410 that includes at least a portion of the transaction identifier 116. In some implementations, the transaction identifier 116 may be included in the data stored 408 for the sale header record.

At 612, a determination is made whether the amount of data in the transaction data 114 exceeds a record size for the transaction datastore 120. If so, then at 614 one or more sale line item records may be generated, each including data for one or more sale line items. In cases where at least one sale line item was included in the sale header record, the sale line item record(s) may include the subsequent line item(s) not included in the sale header record. The sale line item record(s) may be generated with a format such as that described with reference to FIG. 4. If the determination at 612 is negative, the process may proceed to 616.

At 616, the sale header record and the sale line item record(s), if any, are written to the transaction datastore 120. In some implementations, the write operations are performed in an inverse order from the ordering of the records as indicated by the counter 414. For example, the sale transaction data 402 shown in FIG. 4 includes N data records 118 with counter values ranging from 0 to N, and with the first data record (e.g., the header data record) having a counter value of 0. In this example, the Nth data record may be written first, and (N−1)th record may be written second, and so forth, until the 0th data record (e.g., the header data record) is written last. In this way, implementations may block processes from reading the data records 118 for a particular transaction until all the data records 118 have been written for a transaction. This may prevent errors in reading the data, corrupted results of read operations, and so forth.

In addition to, or instead of, the inverse ordered write operations described above, implementations may employ other mechanisms to ensure that processes are blocked from reading the data records 118 for a particular transaction until all such data records 118 have been written. For example, for sale transactions, header transactions, or other types of data, the header data record(s) may include the number of line items for the transaction, or a checksum derived based on the transaction data 114 as a whole. Reading processes may be blocked from reading records for the transaction if the corresponding number of line items has not been written, or if a calculated checksum for the stored transaction data does not match the checksum included in the header record. Moreover, in some cases an end-of-file record may be written following the writing of the last record for a transaction, and readers may be blocked from reading transaction records if the end-of-file record is not present.

At 618, the transaction identifier 116 is sent to the access device 102. In some implementations, the abbreviated transaction identifier 322 may be generated as described above and sent to the access device 102 instead of or in addition to the transaction identifier 116.

At 620, the access device 102 receives the transaction identifier 116 or the abbreviated transaction identifier 322. The access device 102 may then store the transaction identifier 116 or the abbreviated transaction identifier 322 locally, to be available for storing data for refund transactions associated with the sale transaction. The transaction identifier 116 or the abbreviated transaction identifier 322 may also be provided to a customer or other entity on a printed receipt, through an email, through a text message, or by other means.

FIG. 7 depicts a flow diagram 700 of a process for storing data associated with a second type of transaction, e.g., refund transaction data, in the transaction datastore 120. The flow diagram 700 depicts operations performed on the access device 102, operations performed on the data processing server device(s) 110, and communications between the access device 102 and the data processing server device(s) 110. In some implementations, the operations performed on the access device 102 are performed by the transaction module 104, and the operations performed on the data processing server device(s) 110 are performed by the data processing module 112.

At 702, a user of the access device 102 (e.g., a merchant) may initiate a refund transaction with a consumer. The refund may be associated with a previous purchase made by the consumer from the user of the access device 102. For example, the consumer may be returning all or some of the goods previously purchased, in exchange for a refund of the sale price of the returned goods. During the refund transaction, or after completion of the refund transaction, the access device 102 may send the data storage request 108 to request that at least a portion of the transaction data 114 for the refund be stored in the transaction datastore 120. The data storage request 108 may be generated and sent as described above.

At 704, the access device 102 sends the transaction data 114 for the refund transaction. The sending of the transaction data 114 may proceed similarly as described above with reference to FIG. 6. In some implementations, the transaction data 114 includes refund header data, and data for one or more refund line items. In some implementations, one or both of the transaction data 114 and the data storage request 108 may also include the transaction identifier 116 or the abbreviated transaction identifier 322 associated with the sale transaction that is being at least partly refunded. In some cases, the transaction identifier 116 or the abbreviated transaction identifier 322 is provided by the consumer from a sale receipt, or is stored on the access device 102 and identified by a user of the access device 102 as corresponding to the previous sale. The transaction data 114 may be serialized according to a serialization standard such as the JSON standard. In some implementations, the sending of the data storage request 108 or the transaction data 114 is asynchronous.

At 706, the transaction data 114 is received at the data processing server device 110. At 708, a refund header record is generated to store a first portion of the transaction data 114. The refund header record may be generated with a format as described with reference to FIG. 4, and may include header data for the refund transaction. In some cases, a record key for the refund header record may include a hash key 410 that is related to the hash key of the associated sale transaction, as described above with reference to FIG. 4. The refund header record may also include data for zero or more refund line items, as described above with reference to the sale header record in FIG. 6. In some implementations, the refund header record and the subsequent line item records are generated with a hash key 410 that includes the transaction identifier 116. In some implementations, the transaction identifier 116 may be included in the data stored 408 for the refund header record. In cases where the transaction data 114 or the data storage request 108 includes the abbreviated transaction identifier 322, the abbreviated transaction identifier 322 may be mapped to the transaction identifier 116 using mapping information stored in the mapping data 324.

At 710, a determination is made whether the amount of data in the transaction data 114 exceeds a record size for the transaction datastore 120. If so, then at 712 one or more refund line item records may be generated, each including data for one or more refund line items. In cases where at least one refund line item was included in the refund header record, the refund line item record(s) may include the subsequent line item(s) not included in the refund header record. The refund line item record(s) may be generated with a format as described with reference to FIG. 4. If the determination at 710 is negative, the process may proceed to 714.

At 714, the refund header record and the refund line item record(s), if any, are written to the transaction datastore 120. In some implementations, the write operations are performed in an inverse order from the record order indicated by the counter 414, as described above with reference to FIG. 6. Alternatively, the refund header record may be written with a checksum or an end-of-file record may be written as described above, to prevent fault read operations of incompletely written transaction data.

FIG. 8 depicts a flow diagram 800 of a process for retrieving a first portion of stored data for presentation on the access device 102, and subsequently retrieving one or more additional portions of the stored data for presentation through pagination on the access device 102. The flow diagram 800 depicts operations performed on the access device 102, operations performed on the data processing server device(s) 110, and communications between the access device 102 and the data processing server device(s) 110. In some implementations, the operations performed on the access device 102 are performed by the transaction module 104, and the operations performed on the data processing server device(s) 110 are performed by the data processing module 112.

At 802, a user of the access device 102 (e.g., a merchant) may request to view or otherwise be presented with information regarding a previous transaction, such as a sale transaction or a refund transaction. In some implementations, the request for information may include the transaction identifier 116 or the abbreviated transaction identifier 322 associated with the previous transaction. In some implementations, the request may be generated through the user interface 500. The data request 122(1) for a first portion of the transaction data may be sent to the data processing server device 110.

At 804, the data processing server device 110 may search the transaction datastore 120 for data record(s) 118 associated with the transaction identifier 116 included in the data request 122(1). In some implementations, the search may identify those data record(s) 118 with a hash key 410 that includes the transaction identifier 116. In cases where the data request 122(1) includes the abbreviated transaction identifier 322, the mapping data 324 may be employed to identify a transaction identifier 116 that corresponds to the abbreviated transaction identifier 322. At 806, a determination is made whether any records are found that correspond to the transaction identifier 116. If not, then at 808 an error message or other notification may be sent to the access device 102, indicating that no records were found in the search.

If the determination at 806 is positive, then at 810 the sale header record corresponding to the transaction identifier 116 may be retrieved from the transaction datastore 120. If the transaction datastore 120 includes information for any refunds associated with the sale, one or more refund header records corresponding to the transaction identifier 116 may also be retrieved. The retrieved sale header record and refund header record(s), if any, may then be sent to the access device 102 as data record(s) 118(1). At 812, the user interface 500 may present the sale header record, and any refund header record(s), to the user of the access device 102, e.g. through the user interface 500.

As described above with reference to FIG. 5, some implementations provide functionality to allow a user of the access device 102 to request additional information for the sale transaction or for any refund transaction that is associated with the sale transaction. At 814, the user of the access device 102 may request one or more additional line items for the sale or refund transaction, generating a data request 122(2). In some implementations, the data request 122(2) may include the transaction identifier 116. The data request 122(2) may also include a value for the counter 414, to indicate a next record to be retrieved.

At 816, a search of the transaction datastore 120 is performed to identify the requested additional line items, corresponding to the transaction identifier 116 and counter 414. At 818, a determination is made whether any such additional line item records are found in the transaction datastore 120. If not, then at 820 an error message or other notification may be sent to the access device 102, indicating that no records were found in the search.

If the determination at 818 is positive, then at 822 the sale line item record(s) or refund line item record(s) corresponding to the transaction identifier 116 and the counter 414 may be retrieved from the transaction datastore 120. The retrieved line item record(s) may then be sent to the access device 102 as data record(s) 118(2). At 824, the user interface 500 may present the additional line item record(s) to the user of the access device 102, e.g. through the user interface 500.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   at least one memory storing computer-executable instructions; and
   at least one processor configured to access the at least one memory and execute the computer-executable instructions to:
   receive transaction data related to a transaction and a data storage request from a first device;
   divide the transaction data to generate a plurality of records, each of the plurality of records including at least one portion of the transaction data;
   generate a record identifier for each of the plurality of records, wherein:
   the record identifier for the each of the plurality of records indicates that the each of the plurality of records is part of the transaction data by comprising a hash key corresponding to the transaction data and being common to the plurality of records, the hash key including a transaction identifier based on one or more of information indicative of the data storage request, an identifier associated with an access device, or a user identifier of a user of the access device, and the record identifier for the each of the plurality of records further indicates a sequential order of the each of the plurality of records among the plurality of records by comprising a counter value that is initialized for a first record of the plurality of records and incremented for each subsequent record of the plurality of records, and
   the record identifier for the each of the plurality of records further indicates a range key prefix associated with a transaction type for each of the plurality of records, wherein the transaction type for each of the plurality of records is of a different transaction type;
   store the each of the plurality of records in a datastore, using the record identifier for the each of the plurality of records, in an order that is inverse to the counter value for the each of the plurality of records;
   receive, from the first device, a request for data from the transaction data;
   retrieve the first record of the plurality of records from the datastore, based on the hash key, the counter value, and the range key prefix of the first record of the plurality of records, whereby the retrieval of the first record based on the hash key, the counter value, and the range key prefix provides for lower latency retrieval; and
   send, to the first device, the first record of the plurality of records in response to the request.

2. The system of claim 1, wherein the at least one portion of the transaction data included in the each of the plurality of records has a size that is less than or equal to a record size of the datastore.

3. The system of claim 1, wherein the hash key is unique to the transaction data.

4. The system of claim 1, wherein the sending the first record of the plurality of records enables the first device to display the at least one portion of the transaction data included in the first record of the plurality of records.

5. The system of claim 4, the computer-executable instructions further configured to:
   receive, from the first device, at least one subsequent request for additional data from the transaction data;

retrieve at least one subsequent record of the plurality of records from the datastore, based on at least the hash key and the counter value of the at least one subsequent record; and send, to the first device, the at least one subsequent record in response to the at least one subsequent request, enabling the first device to present the at least one portion of the transaction data included in the at least one subsequent record.

6. The system of claim 1, wherein the transaction data is received in a data stream that is serialized based at least partly on a JavaScript Object Notation (JSON) standard.

7. The system of claim 1, wherein the datastore comprises a non-relational database that does not employ a relational database management system (RDBMS).

8. The system of claim 1, the computer-executable instructions further configured to:

receive, from the first device, a request to store the transaction data; and generate the transaction identifier based on the one or more of the information indicative of the data storage request, the transaction identifier associated with the first device, or the user identifier of the user of the first device.

9. The system of claim 8, the computer-executable instructions further configured to:

generate an abbreviated transaction identifier;

associate the abbreviated transaction identifier with the transaction identifier in the datastore;

send the abbreviated transaction identifier to the first device;

receive, from the first device, a subsequent request for at least one of the plurality of records stored in the datastore, the subsequent request including the abbreviated transaction identifier;

determine the transaction identifier, based on the association of the abbreviated transaction identifier with the transaction identifier in the datastore; and retrieve the at least one of the plurality of records, based on the transaction identifier.

10. One or more non-transitory computer-readable media storing instructions which, when executed by at least one processor, instruct the at least one processor to perform actions comprising:

receiving transaction data for a transaction;

dividing the transaction data to generate a plurality of records, each of the plurality of records including a portion of the transaction data;

generating a record identifier for each of the plurality of records, wherein:

the record identifier for the each of the plurality of records indicates that the each of the plurality of records is part of the transaction data by comprising a key corresponding to the transaction data and being common to the plurality of records, and the record identifier for the each of the plurality of records further indicates a sequential order for the each of the plurality of records among the plurality of records by comprising a counter value that is initialized for a first record of the plurality of records and incremented for each subsequent one of the plurality of records, and the record identifier for the each of the plurality of records further indicates a range key prefix associated with a transaction type for the each of the plurality of records by comprising a value that initialized for the first record of the plurality of records and increment for the each subsequent one of the plurality of records, wherein the transaction type for each of the plurality of records is of a different transaction type;

storing the each of the plurality of records in a datastore, using the counter value for the each of the plurality of records, in an order that is inverse to the counter value for each of the plurality of records;

receiving, from a device, a request for data from the transaction data;

retrieving the first record of the plurality of records from the datastore, based on the key, the counter value, and the range key prefix for the first record of the plurality of records, whereby the retrieval of the first record based on the key, the counter value, and the range key prefix provides for lower latency retrieval; and sending, to the device, the first record of the plurality of records in response to the request.

11. The one or more non-transitory computer-readable media of claim 10, wherein:

the transaction data is for the transaction of the transaction type; and the key further comprises a hash key corresponding to the transaction.

12. The one or more non-transitory computer-readable media of claim 10, wherein the sending the first record of the plurality of records enables the device to display the portion of the transaction data included in the first record of the plurality of records.

13. The one or more non-transitory computer-readable media of claim 12, the actions further comprising:

receiving, from the device, at least one subsequent request for additional data from the transaction data;

retrieving at least one subsequent record of the plurality of records from the datastore, based on at least the key and the counter value of the at least one subsequent record; and sending, to the device, the at least one subsequent record, in response to the at least one subsequent request, for presentation on the device.

14. The one or more non-transitory computer-readable media of claim 10, wherein the first record of the plurality of records includes a checksum for the transaction data.

15. A computer-implemented method comprising:

receiving sale transaction data from a device, the sale transaction data associated with a sale transaction of a sale transaction type, the sale transaction data including a sale header and one or more sale line items;

determining that the sale transaction data is larger than a record size of a datastore;

in response to the determination that the sale transaction data is larger than the record size of the datastore, dividing the sale transaction data into at least one sale header record and one or more line item records;

generating the at least one sale header record, the at least one sale header record including the sale header and at least one of the one or more sale line items, the at least one sale header record associated with a sale header record identifier, wherein:

the sale header record identifier indicates that the at least one sale header record is part of the sale transaction data by comprising a key corresponding to the sale transaction data and being common to the at least one sale header record and the one or more line item records, the key including a sale transaction identifier based on one or more of a time stamp for the sale transaction data, a device identifier associated with the device, or an identifier of one or more parties involved with the sale transaction, and the sale header record identifier further indicates that the at least one sale header record is a first record in the sale transaction data by comprising an initial counter value;

generating one or more sale line item records each including at least one of the one or more sale line items not included in the at least one sale header record, each of the one or more sale line item records associated with a sale line item record identifier, wherein:

the sale line item record identifier for the each of the one or more sale line item records indicates that the each of the one or more sale line item records is part of the sale transaction data by comprising the key corresponding to the sale transaction data, and the sale line item record identifier for the each of the one or more sale line item records further indicates a sequential order for the each of the one or more sale line item records, after the sale header record, and among the one or more sale line item records by comprising a counter value that is incremented from the initial counter value for the each of the one or more sale line item records, and the sale line item record identifier for the each of the one or more sale line item records further indicates a range key prefix associated with the sale transaction type for the each of the one or more sale line item records, after the sale header record, and among the one or more sale line item records, wherein the sale transaction type for each of the plurality of records is of a different sale transaction type;

storing the sale header record and the one or more sale line item records in the datastore, using the counter values for the sale header record and the one or more sale line item records, in an order that is inverse to the counter value for each of the plurality of records;

receiving, from the device, a request for data from the sale transaction data;

retrieving the sale header record and a first one of the one or more sale line item records from the datastore, based on the key, the counter value, and the range key prefix for the sale header record and the first one of the one or more sale line item records, whereby the retrieval of the sale head record based on the key, the counter value, and the range key prefix provides for lower latency retrieval; and sending, to the device, the sale header record and the first one of the one or more sale line item records in response to the request.

16. The method of claim 15, further comprising:
receiving a data storage request from the device;
generating the sale transaction identifier based on the one or more of the time stamp, the device identifier associated with the device, or the identifier of the one or more parties involved with the sale transaction; and
sending the sale transaction identifier to the device.

17. The method of claim 15, wherein the sending the sale header record and the first one of the one or more sale line item records enables
the device to display at least one portion of the sale transaction data included in the sale header record and the first one of the one or more sale line item records.

18. The method of claim 15, further comprising:
receiving refund transaction data from the device, the refund transaction data associated with a refund transaction of a refund transaction type, the refund transaction data including a refund header, and one or more refund line items, the refund transaction data further including the sale transaction identifier corresponding to the sale transaction;

generating a refund header record that includes the refund header and at least one of the one or more refund line items, the refund header record associated with a refund header record identifier comprising:
a second key corresponding to the refund transaction data, the second key including a refund transaction identifier based on the one or more of a time stamp for the refund transaction data, the device identifier associated with the device, or a user identifier of a user of the device, and
the initial counter value;

based on a determination that the refund transaction data is larger than the record size of the datastore, generating one or more refund line item records each including at least one of the one or more refund line items not included in the refund header record, each of the one or more refund line item records associated with a refund line item record identifier comprising:
the second key corresponding to the refund transaction data, and
the counter value that is incremented from the initial counter value for the each of the one or more refund line item records;

storing the each of the one or more refund line item records in the datastore, the storing performed in an order that is inverse to the counter value for the each of the one or more refund line item records; and following the storing of the each of the one or more refund line item records, storing the refund header record in the datastore.

19. The one or more non-transitory computer-readable media of claim 10, wherein at least one portion of the transaction data included in the each of the plurality of records has a size that is less than or equal to a record size of the datastore.

20. The one or more non-transitory computer-readable media of claim 10, wherein the sending the first record of the plurality of records enables the first device to display the at least one portion of the transaction data included in the first record of the plurality of records.

* * * * *

UNITED STATES PATENT AND TRADEMARK OFFICE
CERTIFICATE OF CORRECTION

PATENT NO. : 10,169,757 B1
APPLICATION NO. : 13/754495
DATED : January 1, 2019
INVENTOR(S) : Rajendra Kumar Vippagunta and Sumesh Santha Kumar Page 1 of 1

It is certified that error appears in the above-identified patent and that said Letters Patent is hereby corrected as shown below:

In the Claims

Column 23, Line 43:
Reads "sale head record".
Correction should read "sale header record".

Signed and Sealed this
Fifth Day of March, 2019

Andrei Iancu
*Director of the United States Patent and Trademark Office*